W. E. DEAN.
FLUID PRESSURE BRAKE.
APPLICATION FILED NOV. 29, 1916.
1,295,010.
Patented Feb. 18, 1919.
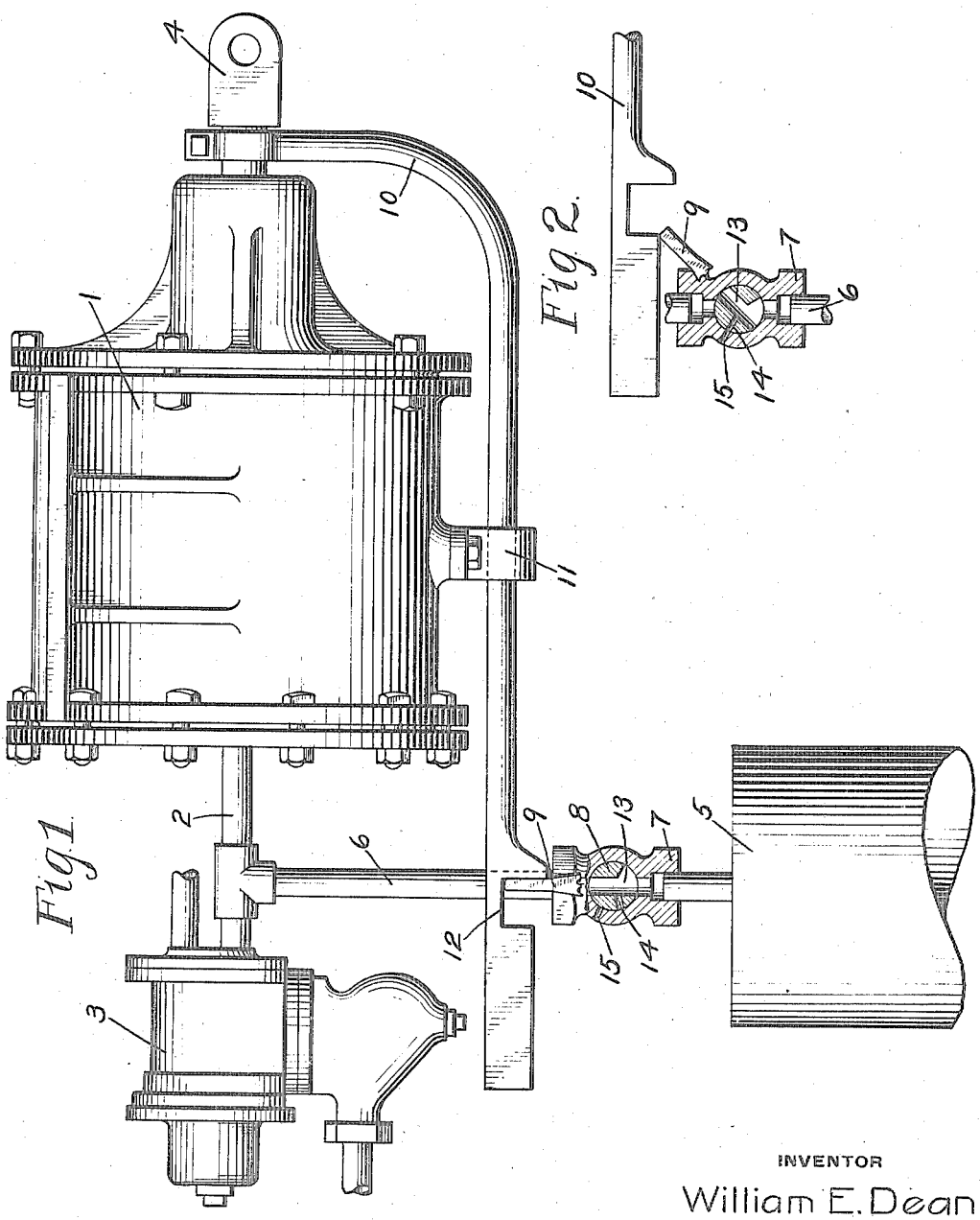
INVENTOR
William E. Dean
by Wm. M. Cady
Atty.

UNITED STATES PATENT OFFICE.

WILLIAM E. DEAN, OF WILMERDING, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

1,295,010. Specification of Letters Patent. Patented Feb. 18, 1919.

Application filed November 29, 1916. Serial No. 134,075.

*To all whom it may concern:*

Be it known that I, WILLIAM E. DEAN, a citizen of the United States, residing at Wilmerding, in the county of Allegheny and State of Pennsylvania, have invented new and useful Improvements in Fluid-Pressure Brakes, of which the following is a specification.

This invention relates to fluid pressure brakes, as employed in railway service for stopping trains.

In order to eliminate the possibility of the brake cylinder piston striking the non-pressure head of the brake cylinder where false piston travel due to spring of the brake rigging and drag of the brake shoes is excessive, it has been the practice in some cases to allow the slack adjuster to act under the influence of false piston travel so that a brake cylinder piston travel is obtained which is less than the amount for which the fluid pressure brake is designed, and while the desired object of preventing the brake cylinder piston from striking the non-pressure head of the brake cylinder is thus accomplished, the brake cylinder pressure obtained for a given reduction in brake pipe pressure will be greater than desired, since the brake cylinder volume is less than it should be.

In order to compensate for the shorter piston travel, the principal object of my invention is to provide means for increasing the effective volume of the brake cylinder in applying the brakes.

In the accompanying drawing, Figure 1 is a diagrammatic view of a car air brake equipment, showing my improvement applied thereto, and Fig. 2 is a sectional view of the reservoir cut-off valve in position for cutting off the reservoir from the brake cylinder.

According to Fig. 1 of the drawing, there is provided a brake cylinder 1 connected by pipe 2 to a triple valve device 3 and having the usual brake cylinder piston rod 4.

A reservoir 5 is connected by pipe 6 to the brake cylinder supply pipe 2 and interposed in the pipe 6 is a cock 7 having a plug valve 8 adapted to be operated by a handle 9. Secured to the brake cylinder piston rod 4 is a bent rod 10 which extends rearwardly of the brake cylinder 1, being supported by a bracket 11 secured to the brake cylinder.

The rear end of the rod 10 has a notch 12, within which the handle 9 operates.

In operation, with the brakes released as shown, the valve 8 is in position for establishing communication from reservoir 5 to pipe 2 through a passage 13.

Upon applying the brakes, fluid under pressure is supplied by the usual operation of the triple valve device 3 through pipe 2 to the brake cylinder 1, and since communication is now open from pipe 2 to the reservoir 5, fluid is also supplied to the reservoir, so that the brake cylinder pressure will not build up to the extent it would otherwise.

As the brake cylinder piston moves out, the piston rod 4 moves the rod 10 and the cock handle 9 is turned. When the piston travel attains a predetermined amount, say four or five inches, the valve 8 is turned so as to cut off the reservoir 5 from the brake cylinder and upon a slightly further movement, a port 14 leading to port 13 is brought into registry with an atmospheric exhaust port 15, so that the reservoir 5 is exhausted to the atmosphere.

By thus venting fluid from the reservoir 5, the release of the brakes is facilitated, since it is not necessary to release the fluid in the reservoir through the exhaust port of the triple valve device.

Having now described my invention, what I claim as new and desire to secure by Letters Patent, is:—

1. In a fluid pressure brake, the combination with a brake cylinder, of a chamber normally connected to the brake cylinder and means for cutting off communication from said chamber to the brake cylinder upon movement of the brake cylinder piston in applying the brakes.

2. In a fluid pressure brake, the combination with a brake cylinder, of a chamber normally connected to the brake cylinder and means operated upon a predetermined brake cylinder piston travel for cutting off communication from said chamber to the brake cylinder.

3. In a fluid pressure brake, the combination with a brake cylinder, of a reservoir, a valve having a port normally connecting said reservoir to the brake cylinder and means movable with the brake cylinder piston for closing said valve upon a predetermined brake cylinder piston travel.

4. In a fluid pressure brake, the combination with a brake cylinder, of a chamber, a valve normally connecting said reservoir with the brake cylinder, and means movable with the brake cylinder piston in applying the brakes for cutting off communication from the reservoir to the brake cylinder and for connecting the reservoir with the atmosphere.

In testimony whereof I hereunto set my hand.

WILLIAM E. DEAN.